(12) United States Patent
Yanagisawa

(10) Patent No.: US 7,148,945 B2
(45) Date of Patent: Dec. 12, 2006

(54) OPTICAL DEVICE HAVING A PLURALITY OF OPTICAL MODULATOR UNITS, PROJECTOR EQUIPPING THE SAME, AND PARTICULAR HEAT INSULATION

(75) Inventor: Yoshiyuki Yanagisawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 10/798,281

(22) Filed: Mar. 12, 2004

(65) Prior Publication Data

US 2004/0246390 A1   Dec. 9, 2004

(30) Foreign Application Priority Data

Mar. 14, 2003   (JP)   ............... 2003-070539

(51) Int. Cl.
  *G02F 1/1335*   (2006.01)
  *G03B 21/16*   (2006.01)
(52) U.S. Cl. .............. 349/161; 349/8; 349/58; 349/96; 353/52; 353/56
(58) Field of Classification Search ............ 349/8, 349/161; 353/52, 56
  See application file for complete search history.

(56) References Cited

U.S. PATENT DOCUMENTS 6,359,721 B1 *   3/2002   Fujimori ............... 359/246
6,781,641 B1 *   8/2004   Okada et al. ............. 349/5
6,829,031 B1 * 12/2004   Numata et al. ........... 349/161
6,935,753 B1 *   8/2005   Takezawa et al. ........ 353/119
2002/0126228 A1 *  9/2002  Yajima et al. ............. 349/8

FOREIGN PATENT DOCUMENTS

| JP | 2001-201739 | 7/2001 |
| JP | A 2002-72162 | 3/2002 |
| JP | A-2002-229121 | 8/2002 |
| JP | 2002-287244 | 10/2002 |
| JP | 2003-057754 | 2/2003 |

* cited by examiner

Primary Examiner—Andrew Schechter
(74) Attorney, Agent, or Firm—Oliff & Berridge, PLC

(57) ABSTRACT

An optical device and a projector having the optical device is provided, which have a liquid-crystal display having, on an exit side, a first exit polarizer plate and a second exit polarizer plate arranged thermally insulated from each other and separated in an optical axis direction, the first exit polarizer plate being bonded on a first heat conductor plate which is bonded on an incident surface of a color-combining optical unit while the second exit polarizer plate is bonded on a second heat conductor plate held by a polarization-plate holding frame. By heat release through respective independent routes, it is possible to suppress the deterioration due to the temperature rise on the exit polarizer plates and liquid-crystal display.

18 Claims, 11 Drawing Sheets

OPTICAL DEVICE HAVING A PLURALITY OF OPTICAL MODULATOR UNITS, PROJECTOR EQUIPPING THE SAME, AND PARTICULAR HEAT INSULATION

BACKGROUND OF THE INVENTION

1. Field of Invention

The present invention relates to an optical device and a projector having a plurality of optical modulator units to modulate a plurality of color lights on a color-by-color basis according to image information and a plurality of light flux incident surfaces on which the optical modulator units are arranged oppositely, to combine together and emit the color lights modulated by the optical modulator units.

2. Description of Related Art

FIG. 10 is a schematic showing a related art optical device. As shown in FIG. 10, the optical device 10 is provided with an optical modulator unit having a liquid-crystal display (liquid-crystal panel unit) 12 and an exit polarizer plate 14.

The liquid-crystal display 12 has a liquid-crystal panel 16 for image formation having two glass substrates 16A, 16B opposed through a liquid crystal layer (not shown), and a metal liquid-crystal panel holding frame 18 having two frames 18A, 18B accommodating and holding the liquid-crystal panel 16, and attached in a light-incident surface of a color-combining prism 20 as a color-combining optical unit through metal pins 22. The exit polarizer plate 14 is attached to the light-incident surface of the color-combining prism 20.

In FIG. 10, references 24 and 26 represent dustproof glasses while 28 denotes a wiring flexible board.

A related art method, relevant to such an optical device structure, mounts a liquid-crystal panel on a prism unit through a cylindrical spacer having good heat conductivity, as disclosed in JP-A-2002-229121 (see paragraphs [0030]–[0032], FIGS. 9 and 10).

Some related art optical devices provide two exit polarizer plates between a liquid-crystal display and a color-combining prism.

In this optical device, cooling efficiency is enhanced due to the distribution of the heat generated on the exit polarizer plates in addition to cooling both the exit polarizer plates by forced convection of the air.

SUMMARY OF THE INVENTION

In the above-mentioned optical device, because the liquid-crystal panel and the exit polarizer plate are connected to allow heat conduction, the heat generated on the liquid-crystal panel moves toward the exit polarizer plate. For this reason, there is a problem that the temperature on the exit polarizer plate rises to readily cause deterioration. This is prominent on the exit polarizer plate corresponding to green light, of among the exit polarizer plates in the projector for red (R), green (G) and blue (B) light, for example.

This has been confirmed by an experiment measuring a heat generation amount on the liquid-crystal panel and on the incident/exit polarizer plate.

FIG. 11 is a chart showing a result of the measurement of the heat generation amount on each of the liquid-crystal panels and on each of the incident/exit polarizer plates. In the chart, the heat generation amount on each of the liquid-crystal panel, incident polarizer plate and exit polarizer plate is shown as a ratio in the case taking as 1 the heat generation amount on an exit polarizer plate for green.

From this, it can be understood that the heat generation amount is comparatively great on the exit polarizer plate for red•green•blue light and particularly the heat generation amount is the maximum on the exit polarizer plate for green light.

Exemplary aspects of the present invention address this and/or other technical problems, and provide an optical device and projector having the same which can suppress the deterioration due to the temperature rise on the exit polarizer plate.

(1) An optical device of an exemplary aspect of the present invention includes: a plurality of optical modulator units having liquid-crystal panels and exit polarizer plates arranged by heat insulation on the liquid-crystal panels; and a color-combining optical unit to combine parts of light modulated by the plurality of optical modulator units; the exit polarizer plates of the plurality of optical modulator units each are separated in an optical axis direction, to have a first exit polarizer plate arranged at an exit side and a second exit polarizer plate arranged at an incident side.

Due to this, according to an optical device of an exemplary aspect of the invention, because the exit polarizer plates are arranged by heat insulation on the liquid-crystal panel, there is no possibility that the heat generated on the liquid-crystal panel moves to the exit polarizer plate or the heat generated on the exit polarizer plate moves to the liquid-crystal panel.

Accordingly, it is possible to suppress the deterioration due to the temperature rise on the exit polarizer plate.

According to an optical device of an exemplary aspect of the invention, the exit polarizer plates of the plurality of optical modulator units each have two exit polarizer plates, first and second, arranged by separation in an optical axis direction. The heat, as generated on one exit polarizer plate, is generated dispersively on these two exit polarizer plates, hence facilitating the heat release on the exit polarizer plate and reducing or preventing the deterioration due to temperature rise.

(2) In the optical device as described in above (1), the first exit polarizer plate and the second exit polarizer plate may be arranged thermally insulated from each other.

With this structure, the heat generated on the two exit polarizer plates can be released respectively through separate routes, making it possible to further suppress the deterioration due to the temperature rise on the exit polarizer plate.

(3) In the optical device as described in above (2), the color-combining optical unit may be bonded with a first heat conductor plate on each incident surface thereof and bonded with the first exit polarizer plate on the first heat conductor plate, and attached with heat-insulation pins projecting toward the liquid-crystal panel, on the heat-insulation pins, a polarizer-plate holding frame to hold a second heat conductor plate bonded with the second exit polarizer plate and a liquid-crystal panel holding frame holding the liquid-crystal panel are mutually fixed with a predetermined spacing.

With this structure, the heat generated on the first exit polarizer plate is conducted to the first heat conductor plate, the heat generated on the second exit polarizer plate is conducted to the second heat conductor plate, and the heat generated on the liquid-crystal panel is conducted to the liquid-crystal panel holding frame. Moreover, those parts of the heat, because thermally insulated by the heat-insulation pins, can be released respectively through separate routes, further suppressing the deterioration due to the temperature rise on the exit polarizer plate.

(4) In the optical device as described in above (1), the first exit polarizer plate and the second exit polarizer plate may be thermally connected.

With this structure, the parts of the heat generated on the two exit polarizer plates can be released through the same route, simplifying the heat-dissipation mechanism. On these two exit polarizer plates, because heat conduction is made possible from the exit polarizer plate greater in heat generation amount to the other exit polarizer plate, temperature rise can be equalized in the exit polarizer plates.

(5) In the optical device as described in above (4), the color-combining optical unit may be bonded with a first heat conductor plate on each incident surface thereof and bonded with the first exit polarizer plate on the first heat conductor plate, and attached with a polarizer-plate holding frame holding a second heat conductor plate bonded with the second exit polarizer plate, the first heat conductor plate or the polarizer-plate holding frame being attached with heat-insulation pins projecting toward the liquid-crystal panel, a liquid-crystal panel holding frame holding the liquid-crystal panel being fixed on the heat-insulation pins.

With this structure, the heat generated on the first exit polarizer plate and the heat generated on the second exit polarizer plate are conducted to the first heat conductor plate, while the heat generated on the liquid-crystal panel is conducted to the liquid-crystal panel holding frame. Moreover, because those parts of the heat are thermally insulated by the heat-insulation pins, the heat generated on the two exit polarizer plates and liquid-crystal panel can be reduced or prevented from interfering.

(6) In the optical device as described in any of the above (1)–(5), the first heat conductor plate may be thermally connected to a heat conductive block adjacently connected to the color-combining optical unit, the liquid-crystal panel holding frame being thermally joined to an optical component housing supporting the optical unit.

With this structure, the heat conducted to the first heat conductor plate can be released to the heat conductor block. Therefore, it is suitable in the case that the color-combining optical unit is not made of a material having a high thermal conductivity, such as quartz crystal, because of its releasing heat ability is enhanced. In this case, the first heat conductor plate may be bonded to the heat conductor block through a heat conductive rubber. The heat conducted to the heat conductor block can be released to the exterior case or the like of the projector.

The heat conducted to the liquid-crystal panel holding frame can be released to the optical component housing supporting the optical device. In this case, the liquid-crystal panel holding frame may be thermally connected to the optical component housing through the heat conductive rubber member.

(7) In the optical device described in the above (3) or (5), the three polarizer-plate holding frames may be thermally connected with each other.

With this structure, the heat generated on the three second exit polarizer plates are conducted to the polarizer-plate holding frame through the second heat conductor plate. Because the polarizer-plate holding frames are mutually, thermally connected together, the parts of the heat absorbed in the three second exit polarizer plates join together. Consequently, because heat conduction is made possible from the exit polarizer plate greatest in heat generation amount among these three second exit polarizer plates (e.g. the second exit polarizer plate for green light) to the other exit polarizer plates, it is possible to further suppress deterioration due to the temperature rise on the exit polarizer plate.

(8) In the optical device described in the above (7), the three polarizer-plate holding frames may be thermally connected by heat conductive rubber.

With this structure, the mutually adjacent two polarizer-plate holding frames can be thermally connected by a simple way.

(9) In the optical device described in the above (7), the three polarizer-plate holding frames may be thermally connected by heat conductive layers adhered to mutually adjacent two of the polarizer-plate holding frames among the three polarizer-plate sustaining frame and heat conductive members interposed between the heat conductive layers.

With this structure, the mutually adjacent two polarizer-plate holding frames can be thermally connected. The heat conductive layer adhered to the polarizer-plate holding frame use heat conductive rubber or graphite. The heat conductive member interposed between both the heat conductive layers may use a heat conductive resin or metal. The heat conductive member interposed between both the heat conductive layers may be tightened on the polarizer-plate holding frame by screws.

(10) In the optical device described in any of the above (1)–(9), the second exit polarizer plate may have a cross transmissivity set at a transmissivity greater than 50% of a total transmissivity.

With this structure, because a heat generation amount can be increased on the first exit polarizer plate which can efficiently release heat to the exterior case, or the like, of the projector through the first heat conductor plate and heat conductive block and which can increase heat releasing ability easier than the second exit polarizer plate, it is possible to efficiently suppress deterioration due to the temperature rise on the exit polarizer plate.

Cross transmissivity refers to a transmissivity of a ray of light when the polarization axis of a ray of light passing a polarizer plate and the transmission axis of the polarizer plate are orthogonal. In the case of the usual polarizer plate, this value is in a range of 0–several %.

(11) In the optical device described in any of the above (1)–(10), the first heat conductor plate may be formed by a member higher in heat conductivity than the second heat conductor plate.

With this structure, the ability of releasing heat can be further enhanced on the first exit polarizer plate which can efficiently release heat to the exterior case, or the like, of the projector through the first heat conductor plate and heat conductive block and which can increase heat releasing ability easier than the second exit polarizer plate.

(12) An optical device of an exemplary aspect of the invention has, a plurality of optical modulator units each having a liquid-crystal panel and an exit polarizer plate arranged, by heat insulation, on the liquid-crystal panel. The optical device including at least the optical modulator unit to be passed by a greatest intensity of light among the plurality of optical modulator units includes two exit polarizer plates, the exit polarizer plates being arranged separately in an optical axis direction.

Consequently, according to the optical device of an exemplary aspect of the present invention, because the exit polarizer plates are arranged by heat insulation on the liquid-crystal panel, there is no movement of the heat generated on the liquid-crystal panel to the exit polarizer plate nor no movement of the heat generated on the exit polarizer plate to the liquid-crystal panel.

Accordingly, it is possible to reduce or prevent interference between the heat generated on the exit polarizer plate and the heat generated on the liquid-crystal panel, and to suppress the deterioration due to the temperature rise on the exit polarizer plate.

According to an optical device of an exemplary aspect of the invention, at least concerning the optical modulator unit where the greatest intensity of light is to pass, the exit polarizer plate is made by two exit polarizer plates, first and second, where the exit polarizer plate is arranged by separation in the optical axis direction. Also, at least concerning the optical modulator unit of where the greatest intensity of light is to pass, the heat typically generated on one exit polarizer plate is separately generated on the two exit polarizer plates. Accordingly, it is possible to suppress the deterioration due to the temperature rise on the exit polarizer plates.

In the case that the plurality of optical modulator units are optical modulator units to modulate red, green and blue color lights, the optical modulator unit to be passed by the greatest intensity of light refers to the optical modulator unit to modulate green light.

For this reason, it is not necessary to arrange the optical modulator units for blue and red light with their exit polarizer plates separated in the optical axis direction. However, the optical modulator units for blue and red light may include two exit polarizer plates where any or both, are arranged by separation in optical axis direction.

In this case, because the optical modulator unit to be passed by the second greatest intensity of light is the optical modulator unit for blue light, the optical modulator unit for blue light may include two exit polarizer plates arranged by separation in the optical axis direction.

(13) A projector of an exemplary aspect of the present invention includes: an illumination device to emit illumination light; a color-separation optical system to separate illumination light emitted from the illumination device into a plurality of color lights; and a plurality of optical devices to modulate color lights separated by the color-separation optical system and form an image. In the projector the optical devices may be optical devices as described in any of the above (1) to (12).

Therefore, the projector of an exemplary aspect of the invention, is a projector capable of enhancing brightness and reducing cooling fan noise because of having an optical device to suppress the deterioration due to the temperature rise on the exit polarizer plates.

DETAILED DESCRIPTION OF EXEMPLARY EMBODIMENTS

1. First Exemplary Embodiment

Figure 1:
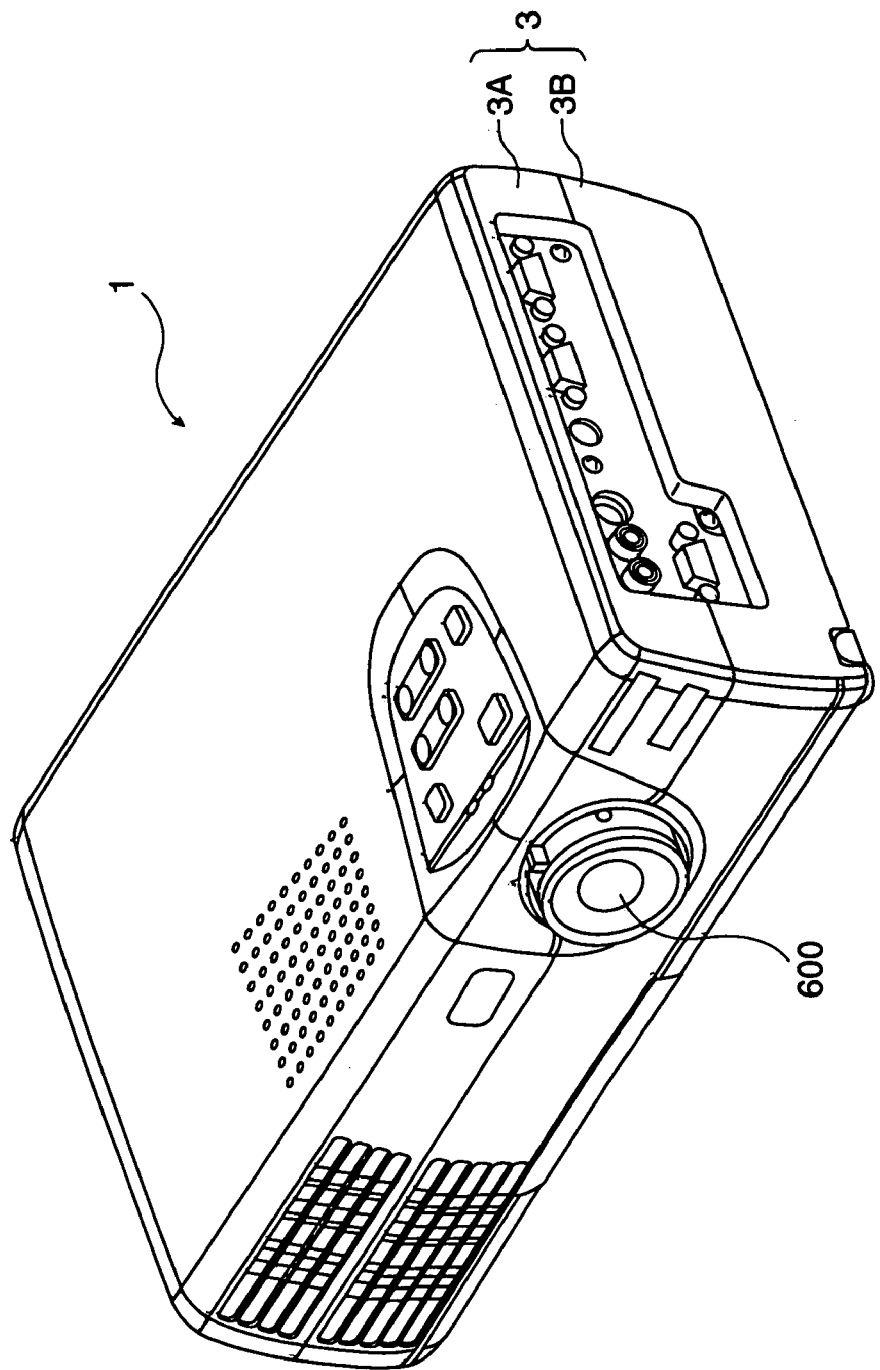
FIG. 1 is a schematic showing an exterior view of a projector according to a first exemplary embodiment of the present invention.

Hereunder, explanations will be made on an optical device and a projector having the same, based on the exemplary embodiments shown in the drawings. In the outset, the first exemplary embodiment of the invention will be explained by using FIGS. 1 through 7.

Figure 2:
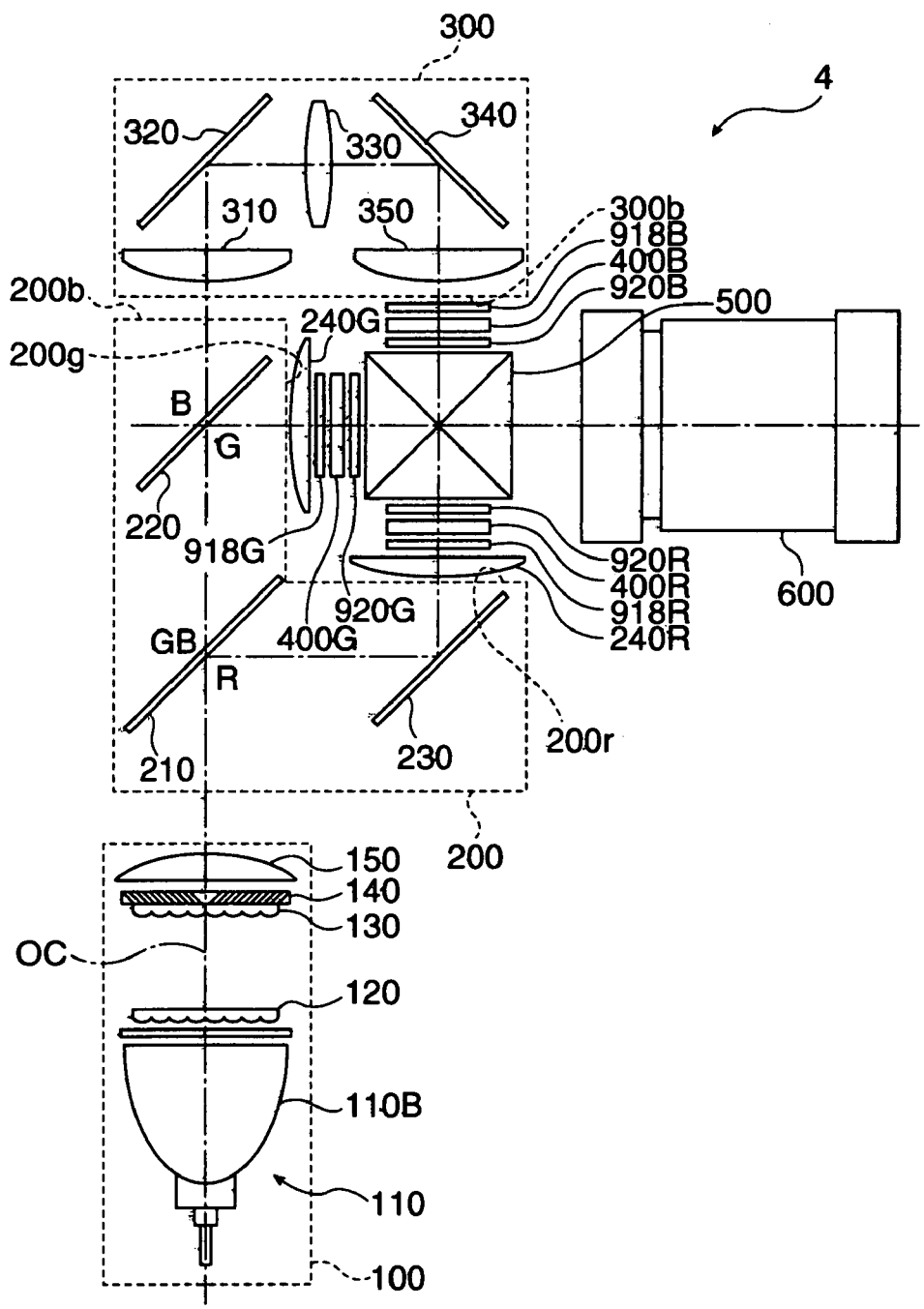
FIG. 2 is a schematic to explain the schematic structure of an optical system.
Figure 3:
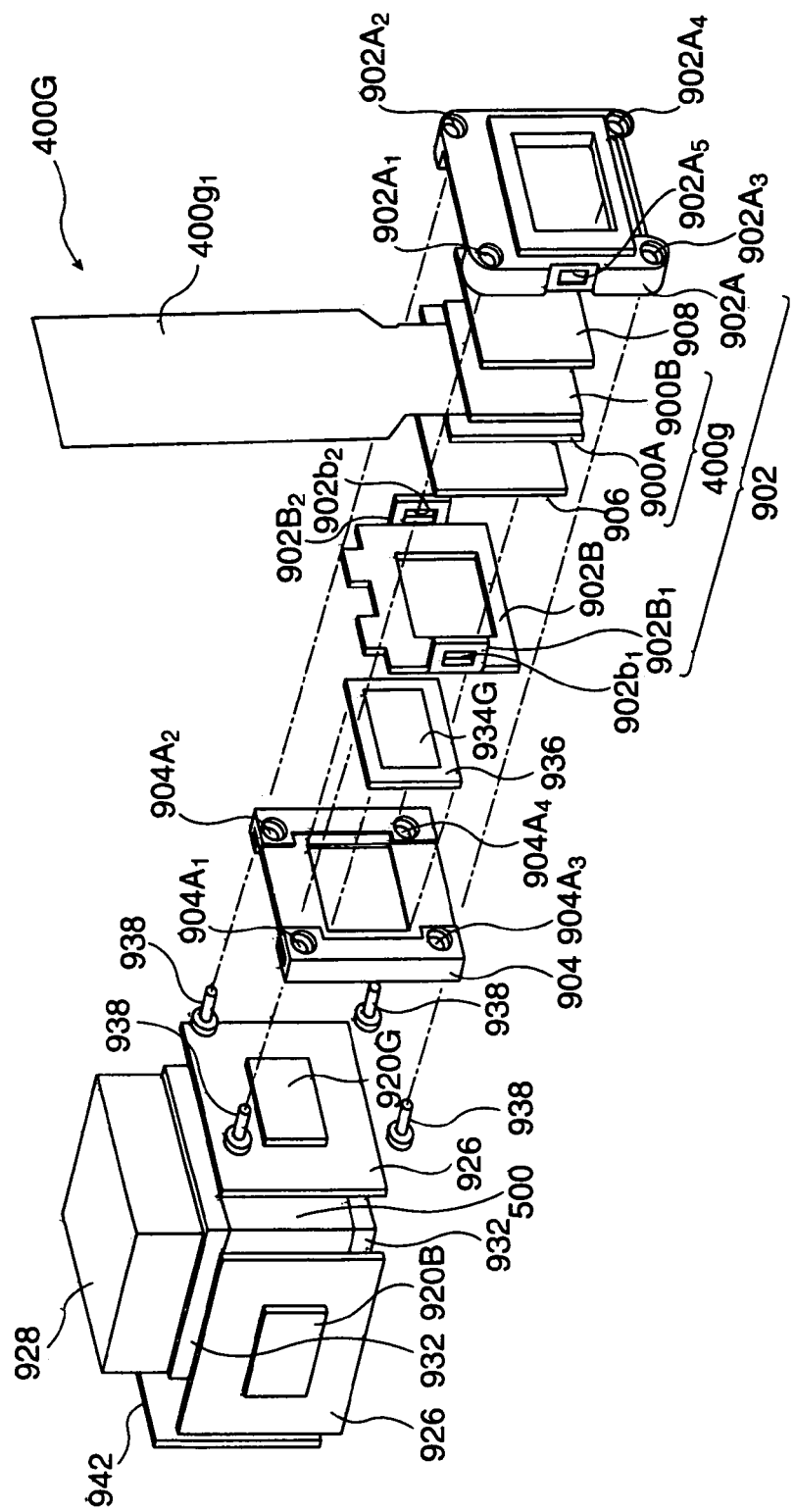
FIG. 3 is a schematic showing a mounting structure of liquid-crystal displays of the first exemplary embodiment.
Figure 4:
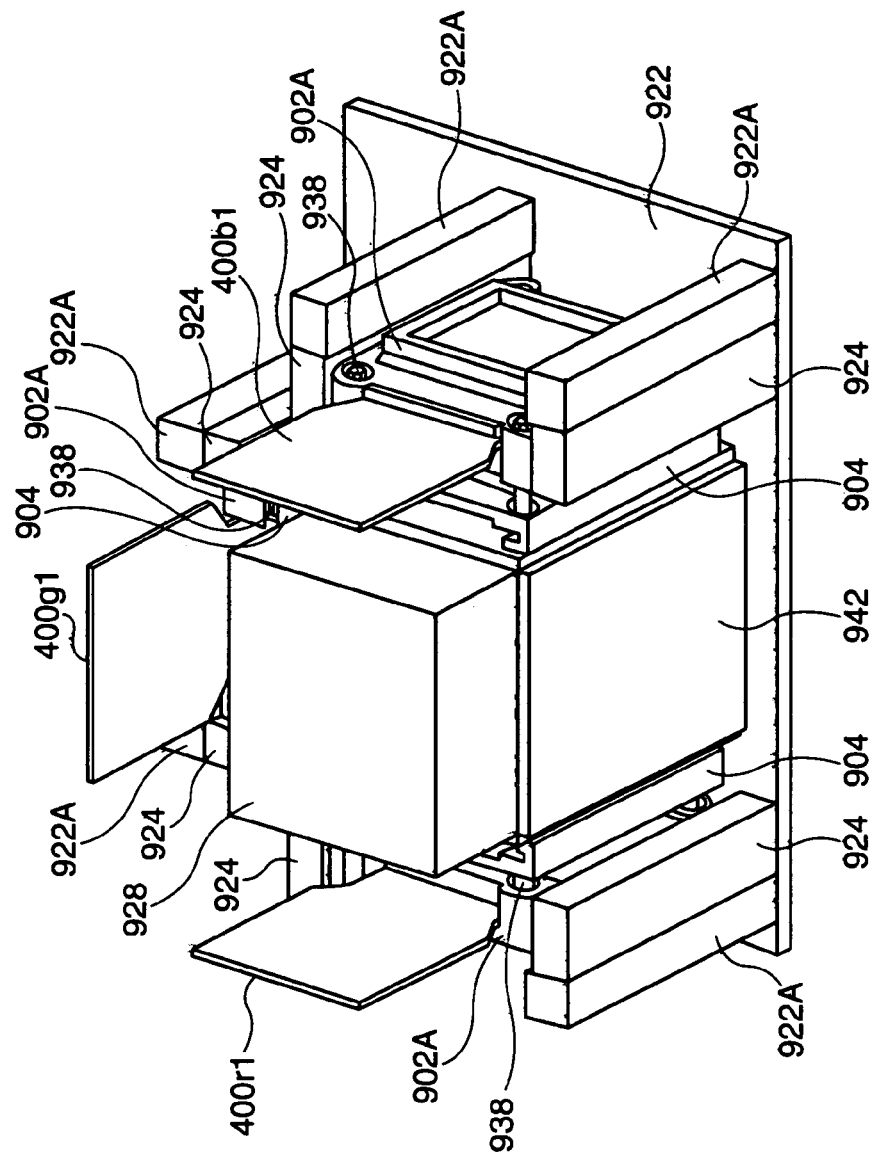
FIG. 4 is a schematic showing a set up state of a color-combining prism.
Figure 5:
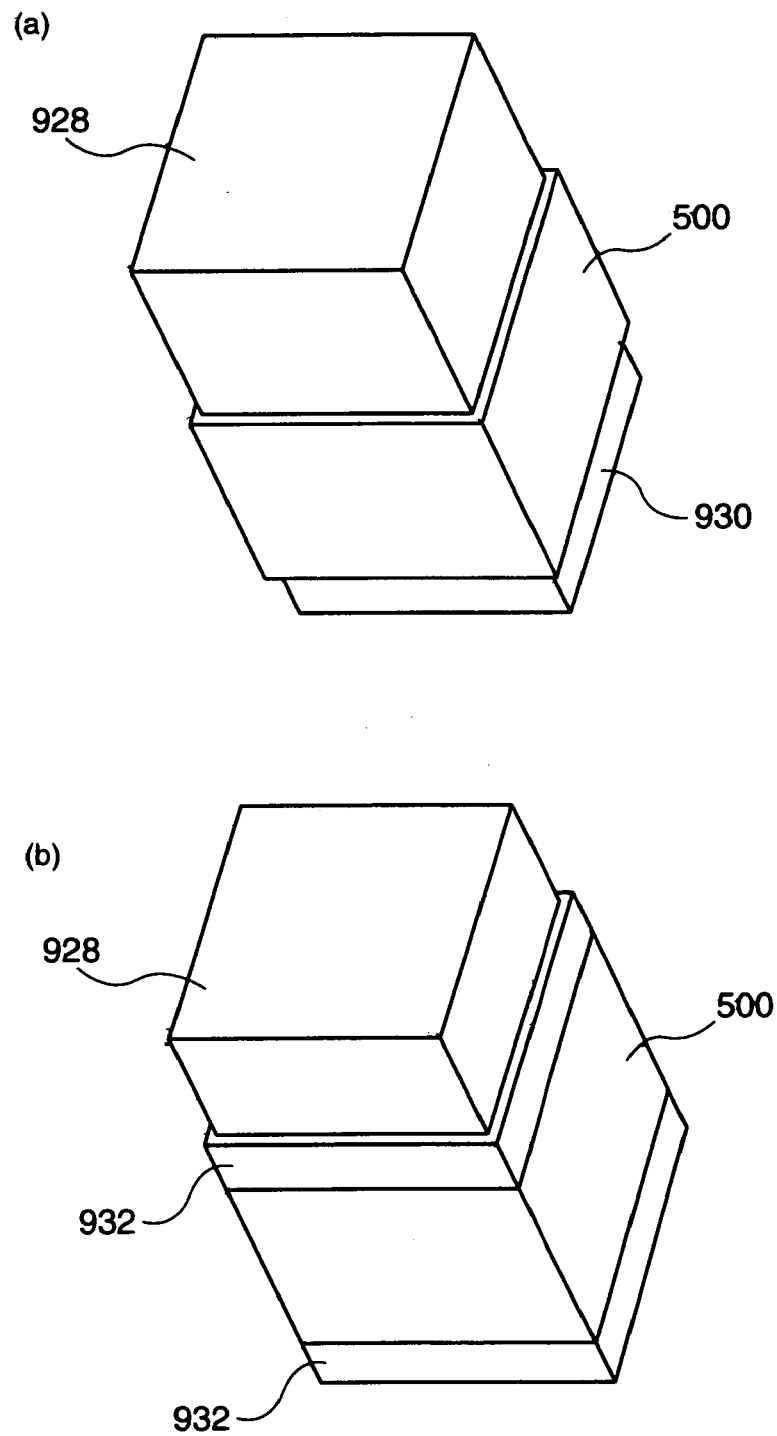
FIGS. 5(*a*) and 5(*b*) are schematics showing a heat conductive rubber member of the color-combining prism.
Figure 6:
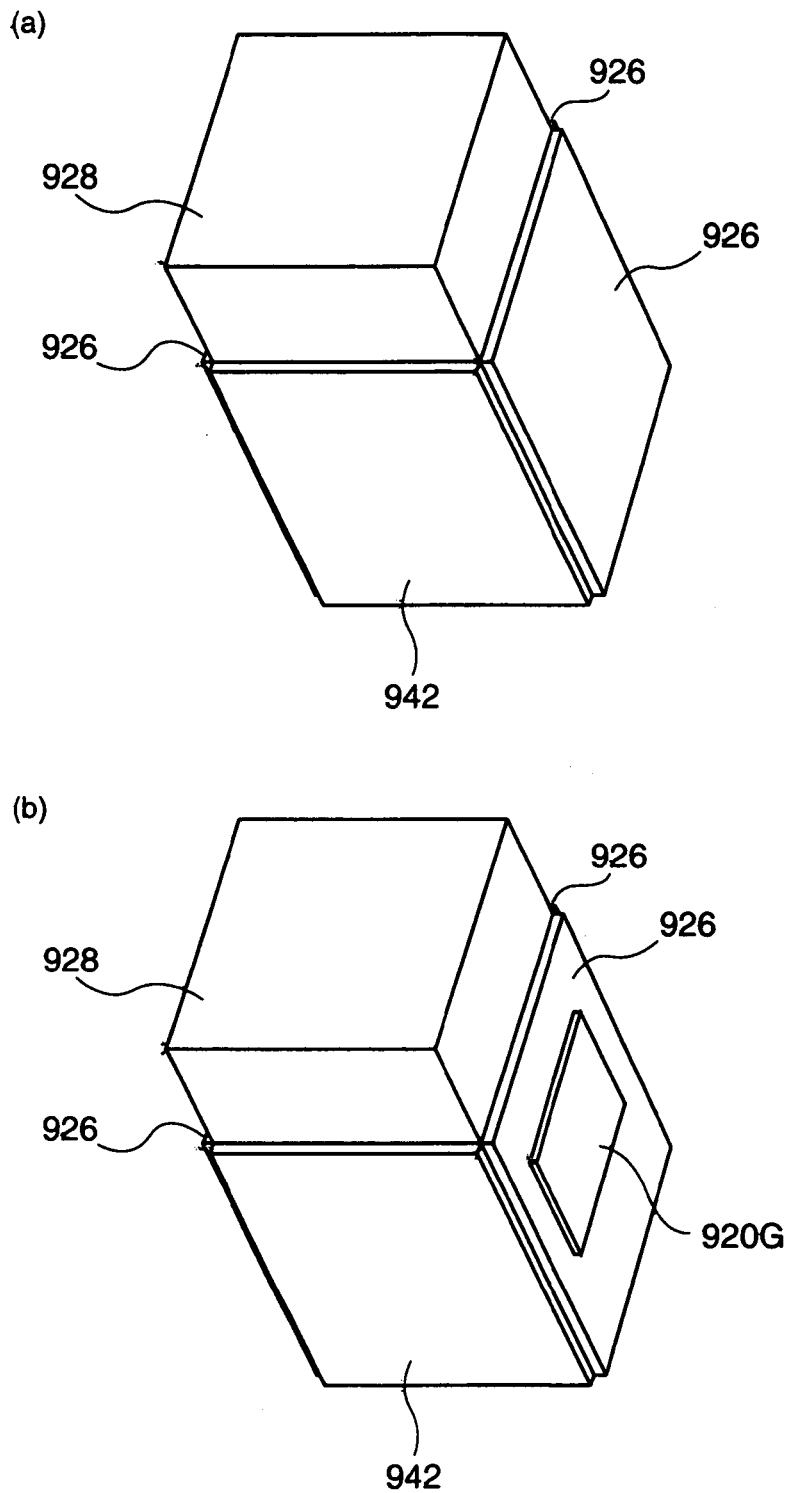
FIGS. 6(*a*) and 6(*b*) are schematics showing an attaching state of heat conductor plates and polarizer plates FIGS. 7(*a*) and 7(*b*) are schematics showing an attaching state of a polarizer-plate holding frame and a polarizer plate.
Figure 7:
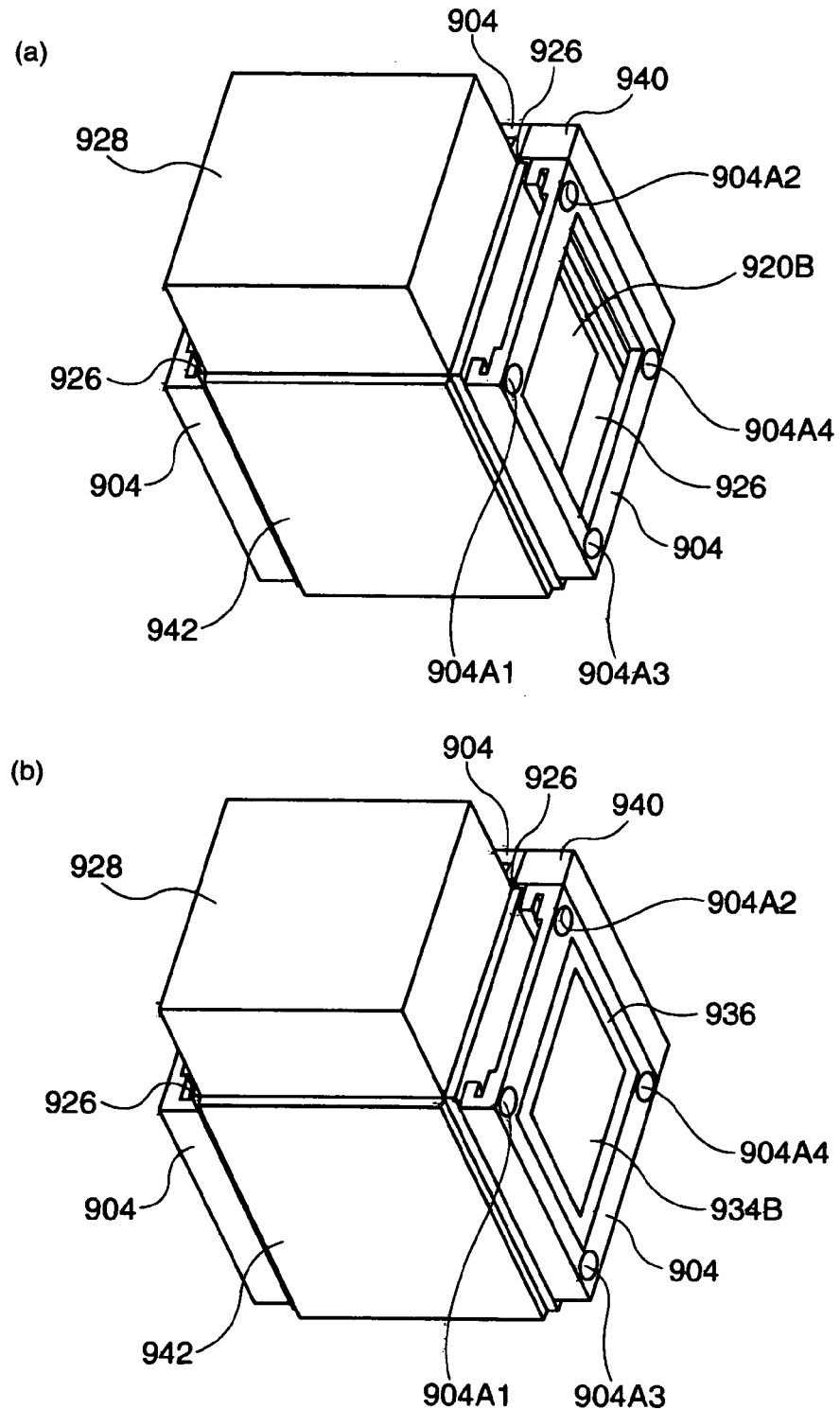

FIG. 1 is a schematic showing an exterior appearance of a projector provided with an optical modulator unit according to the first exemplary embodiment of the invention. FIG. 2 is a schematic showing a schematic structure of an optical system in the projector of FIG. 1. FIG. 3 is a schematic showing an exploded state of mounting, onto a color-combining optical unit, a liquid-crystal display according to the first exemplary embodiment of the invention. FIG. 4 is a schematic showing an arrangement, within an optical part housing, of a liquid-crystal display and color-combining optical unit according to the first exemplary embodiment of the invention. FIGS. 5(*a*) and 5(*b*) are respectively, a schematic showing the color-combining optical unit, and a schematic showing a state of attaching a heat conductive rubber member on the color-combining optical unit. FIGS. 6(*a*) and 6(*b*) are respectively, a schematic showing a state of attaching a first heat conductor plate on the color-combining optical unit, and a schematic showing a state of attaching an exit polarizer plate onto the first heat conductor plate. FIGS. 7(*a*) and 7(*b*) are respectively, a schematic showing a state of attaching a polarizer-plate holding frame on the first heat conductor plate, and a schematic showing a state of attaching a second heat conductor plate and second exit polarizer plate on the polarizer-plate holding frame.

In FIG. 1, the projector shown at reference 1 has an optical system 4 (shown in FIG. 2) having a projection lens 600 which is protruded from the front of the device. The optical system 4, except for the projection lens 600, is built within an exterior case 3. The exterior case 3 is formed by a box nearly in a rectangular form having an upper case 3A and a lower case 3B.

The optical system 4, as shown in FIG. 2, is structured roughly by an illumination optical system 100, a color-separation optical system 200, a relay optical system 300, three liquid-crystal displays 400R, 400G, 400B, and a color-combining optical system (color-combining optical unit) 500, in addition to the projection lens 600. The structural elements of the optical systems are arranged nearly horizontally about the color-combining optical system (color-combining optical unit) 500.

The illumination optical system 100 has a light source unit 110, a first lens array 120, a second lens array 130, a polarization converter element 140 and a superimposition lens 150.

The light source unit 110 has a light source lamp (not shown) and a reflector 110B. The light source lamp uses a high-pressure mercury lamp, for example. The reflector 110B uses a parabolic mirror. Due to this, the emission light emitted from the light source lamp is reflected by the reflector 110B toward one direction and made into a light nearly parallel with an optical axis OC, thus being incident upon the first lens array 120.

The light source lamp may use another light source lamp, such as a metal halide lamp or a halogen lamp.

The reflector 110B may use an ellipsoidal mirror or a spherical mirror. In this case, in order for the light emitted from the light source unit 110 to efficiently enter the first lens array 120, a lens or the like may be arranged between the light source unit 110 and the first lens array 120.

The first lens array 120 is formed by a plurality of small lenses arranged in a matrix form. This is structured to split the light from the light source unit 110 into a plurality of partial light flux, and to collect each of those partial light flux together.

The second lens array 130 has a plurality of small lenses arranged in a manner corresponding to the small lenses of the first lens array 120. This is structured to align the central axes of the partial light flux exited the first lens array 120 to be parallel with the system optical axis.

The polarization converter element 140 is structured to align a non-polarized light into a polarized light having a polarization orientation utilizable in the three liquid-crystal displays 400R, 400G, 400B.

The superimposition lens 150 is structured to superimpose the light exited the second lens array 130 (and polarization converter element 140) onto a predetermined illumination region (image formation region on the liquid-crystal displays 400R, 400G, 400B). This makes it possible to illuminate nearly uniformly the image formation regions of the liquid-crystal displays 400R, 400G, 400B, in conjugation with the actions of the first lens array 120 and the second lens array 130.

The color-separation optical system 200 has a first dichroic mirror 210, a second dichroic mirror 220 and a reflection mirror 230. This is structured to separate the illumination light emitted from the illumination optical system 100 into three colors of illumination light different in wavelength region.

The first dichroic mirror 210 is structured to perpendicularly reflect nearly a red (R) light and makes it travel toward the reflection mirror 230, while allowing nearly a blue (B) and green (G) light to transmit through the same and to travel toward the second dichroic mirror 220.

The second dichroic mirror 220 is structured to perpendicularly reflect nearly a green (G) light and make it exit from an exit 200g toward the color-combining optical system 500, while allowing nearly a blue (B) light to transmit through the same and make it exit from an exit 200b toward the relay optical system 300.

The reflection mirror 230 is structured to perpendicularly reflect nearly a red (R) light and make it exit from an exit 200r toward the color-combining optical system 500.

Field lenses 240R, 240G are respectively arranged on the exit sides (on the side of the liquid-crystal display) of the R-light exit 200r and G-light exit 200g in the color-separation optical system 200. Due to this, the R, G lights which are exited from each exit 200r, 200g are collected to illuminate the liquid-crystal panel of the liquid-crystal displays 400R, 400G. Usually, setting up is done in such a manner that the partial light flux from the illumination optical system 100 are made into light flux that is nearly parallel.

The relay optical system 300 has an incident lens 310, an incident reflection mirror 320, a relay lens 330, an exit reflection mirror 340 and a field lens 350. This is structured to cause the B-light exited the exit 200b of the color-separation optical system 200 to transmit through the relay lenses 310, 330, 350 (reflects upon the reflection mirrors 320, 340), and to exit toward the color-combining optical system 500 from a B-light exit 300b of the relay optical system 300. Due to this, the B-light exited the exit 300b illuminates the liquid-crystal panel of the liquid-crystal display 400B. This suppresses the light amount loss of the B-light having the maximum optical path length.

The magnitude of the light flux incident on the field lens 350 is set to be nearly equal to the magnitude of the light flux incident on the first relay lens 310.

Although this exemplary embodiment explained a case where the color of illumination light to pass the relay optical system 300 is B-light, it may be another color light, such as R-light, in place of B-light.

The liquid-crystal displays 400R, 400G, 400B include, for example, three liquid-crystal displays of transmission type, which are arranged on the incident sides of the color-combining optical system 500 correspondingly to the RGB color lights. Those are structured to modulate each color light exited the color-separation optical system 200 (relay optical system 300 for B-light), and add it with image information corresponding to the color light. Specifically, the liquid-crystal displays 400R, 400G, 400B (liquid-crystal panels referred later) are switch-controlled by a driver (not shown), in accordance with image information. This modulates the color lights to pass through the liquid-crystal displays 400R, 400G, 400B.

Because the liquid-crystal displays 400R, 400G, 400B are nearly the same in structure, an explanation is made only regarding the structure of the liquid-crystal display 400G while omitting the explanation on the structure of the liquid-crystal display 400R, 400B. The liquid-crystal display 400G is constructed roughly by a liquid-crystal panel 400g and a metal frame 902 as a liquid-crystal-panel holding frame, as shown in FIG. 3.

The structural members, such as polarizer plates and polarizer-plate holding frames, arranged on the incident and exit sides of the liquid-crystal display 400G are also arranged similarly on the incident and exit sides of the liquid-crystal display 400R, 400B. Hence, these structural members are explained by assigning the same or equivalent (difference in R, G, B) references.

The liquid-crystal panel 400g has two glass substrates (TFT substrate 900A and counter substrate 900B) opposed to each other through a liquid crystal layer (not shown). This is accommodated and held in a metal frame 902 and connected to a wiring flexible board $400g_1$.

The glass substrate 900A has a multiplicity of pixel electrodes regularly arranged on the liquid crystal layer side and switching elements (both not shown) made of thin-film transistors (TFTs) to apply voltage to the pixel electrodes according to an image signal, thus having a flat rectangular form as a whole.

A dustproof cover 906, made of transparent glass, is bonded on the glass substrate 900A at its incident side. The dustproof cover 906 has a planer size (lengthwise and widthwise dimensions) set nearly equal to the planer size of the glass substrate 900A.

The glass substrate 900B has a counter electrode (not shown) opposed to the pixel electrode of the glass substrate 900A, thus having a flat rectangular form as a whole somewhat smaller than the glass substrate 900A.

A dustproof cover 908 made of transparent glass is bonded on the glass substrate 900B at its incident side. The dustproof cover 908 has a planer size (lengthwise and widthwise dimensions) set nearly equal to the planer size of the glass substrate 900B.

The metal frame 902 is made up of a first frame 902A and a second frame 902B, and is arranged on an incident side of a metal frame 904 as a polarizer-plate holding frame. Furthermore, the metal frame 902 is joined to a pillar 922A on an optical-part housing 922 through a second heat-conductive rubber member 924, as shown in FIG. 4. Due to this, the heat generated on the liquid-crystal panel 400g is thermally conducted to the optical-part housing 922 through the second heat-conductive rubber member 924 and through the second heat-conductive rubber member 924 and a pillar 922A.

The first frame 902A has an exit-sided space (not shown) capable of accommodating the glass substrate 900A and dustproof cover 906, and an incidence-sided space (not shown) communicating with this space and capable of accommodating the glass substrate 900B and dustproof cover 908, thus being entirely formed by a stepped frame nearly in a rectangular form.

At the corners of the first frame 902A, pin-insertion holes $902A_1$–$902A_4$ are provided opened in the juxtaposed direction of the glass substrates 900A, 900B (in the thickness direction of the first frame), as shown in FIG. 3. In the both sides of the first frame 902A, there are provided engaging projections $902A_5$, $902A_6$ (engaging projection $902A_5$ only shown) projecting in the horizontal direction. An incident polarizer plate 918G (shown in FIG. 2) is arranged on the incident side of the first frame 902A.

The second frame 902B is removably attached at exit side of the first frame 902A, as shown in FIG. 3. On both sides of the second frame 902B, there are provided elastically deformable hooks $902B_1$, $902B_2$ having engaging holes $902b_1$, $902b_2$ to be engaged with the engaging projections $902A_5$, $902A_6$ of the first frame 902A. On the exit side of the second frame 902B, there is arranged a first heat conductor plate 926 to be bonded with the first exit polarizer plate 920G, as shown in FIGS. 3 and 6.

The first heat conductor plate 926 is arranged on the incident side of the color-combining optical system 500 as shown in FIG. 3, and joined on a heat conductor block 928 and color-combining optical unit fixing plate 930 shown in FIG. 5(a) through a first heat conductive rubber member 932 shown in the same figure (b). Due to this, when the heat absorbed in the polarizer plate 920G is thermally conducted to the first heat conductor plate 926, thermal conduction is effected from the first heat conductor plate 926 to the heat conductor block 928 and color-combining optical unit fixing plate 930 through the first heat-conductor rubber member 932. In this case, in case the heat conductor block 928 is joined to the exterior case 3 (shown in FIG. 1), the heat absorbed in the polarizer plate 920G is thermally conducted from the first heat conductor plate 926 to the exterior case 3 through the first heat-conductor rubber member 932 and heat-conductor block 928, and dissipated outside from the exterior case 3.

The metal frame 904 is arranged on the green (G) light incident side of the color-combining optical system 500 as shown in FIGS. 3, 4 and 7 (only metal frame for green light passage in FIG. 3), and structured to hold a second heat conductor plate 936 bonded with a second exit polarizer plate 934G. The second exit polarizer plate 934G has a cross transmissivity set at a smaller transmissivity than the total transmissivity of 50%. Due to this, although the amount of heat to be absorbed in the first exit polarizer plate 920G is greater as compared to the amount of heat to be absorbed in the second exit polarizer plate 934G, the heat from the first exit polarizer plate 920G is effectively thermally conducted to the heat conductor block 928 and color-combining optical unit fixing plate 930 through the first heat conductor plate 926 and first heat conductive rubber member 932.

At the corners of the metal frame 904, pin-insertion holes $904A_1$ through $904A_4$ are provided respectively corresponding to the pin-insertion holes $902A_1$ through $902A_4$ of the metal frame 902 (first frame $902A_1$. In the pin-insertion holes $904A_1$ through $904A_4$, $902A_1$ through $902A_4$, heat-insulator pins 938 are inserted and fixed by a ultraviolet-cured resin or the like.

The heat insulator pins 938 are made by four stepped (flanged) pins projecting toward the liquid-crystal panel, as shown in FIG. 3, and attached at the corner of the first heat conductor plate 926 on the incident side. In the intermediate parts of the heat insulator pins 938, the metal frames 902, 904 are mutually fixed with a predetermined spacing. Due to this, the first heat conductor plate 926 and the metal frames 902, 904 are joined together by the heat insulator pins 938. Consequently, there is no heat transfer between the liquid-crystal panel 400g and the first heat conductor plate 926, between the liquid-crystal panel 400g and the second heat conductor plate 936 and between the first heat conductor plate 926 and the second heat conductor plate 936. Due to this, heat is allowed to dissipate through separate routes, making it possible to further suppressing the deterioration in the exit polarizer plate due to temperature rise.

Meanwhile, concerning the metal frame 904, three metal frames 904 for red (R) and blue (B) are thermally connected with each other, as shown in FIGS. 4 and 7. Specifically, of the three metal frames 904, two metal frames 904 mutually adjacent are arranged perpendicular and joined by a heat conductor member 940 made of heat conductive rubber, as shown in FIG. 7.

This closely bonds the heat conductor member 940 to both the metal frames 904, effectively allowing heat conduction between both the metal frames 904 through the heat conductor member 940. Due to this, because heat conduction is made possible from the second exit polarizer plate for green, greatest in heat generation amount of among the three second exit polarizer plates, to the other two second exit polarizer plates, it is possible to suppress, further effectively, the deterioration in the second exit polarizer plate due to temperature rise.

The color-combining optical system 500, made by a color-combining prism, such as a dichroic prism, is arranged on the exit side of each liquid-crystal display 400R, 400G, 400B and interposed between the heat conductor block 928 and the color-combining prism fixing plate 930. This is structured to input the color lights modulated by the liquid-crystal displays 400R, 400G, 400B and combine those together. On the incident sides of the color-combining optical system 500, the first heat conductor plates 926 are arranged correspondingly to R, G and B light. On the exit side of the color-combining optical system 500, there is arranged an exit heat conductor plate 942 capable of conducting heat to the first heat conductor plate 926 through the heat conductive rubber member 932.

The projection lens 600 is arranged on the exit side of the color-combining optical system 500. This is structured to display, with magnification, an image combined by the color-combining optical system 500, as a projection image on a screen (not shown) as a projected plane.

Owing to the above structure, the projector according to the first exemplary embodiment has the first heat conductor plate 926, the metal frame 902 and metal frame 902, and the metal frame 904 that are joined together through heat-insulation pins 938, whereby the first exit polarizer plate 920R, 920G, 920B and the second exit polarizer plate 934R, 934G, 934B are both heat-insulated from the liquid-crystal panel 400*r*, 400*g*, 400*b*.

Because the first heat conductor plate 926 and the metal frame 904 are joined through heat-insulation pins 938, heat insulation is provided between the first exit polarizer plate 920R, 920G, 920B and the second exit polarizer plate 934R, 934G, 934B.

Consequently, the heat generated on the liquid-crystal panel 400*r*, 400*g*, 400*b* does not transfer to the first exit polarizer plate 920R, 920G, 920B and second exit polarizer plate 934R, 934G, 934B. Moreover, there is no heat transfer between the first exit polarizer plate 920R, 920G, 920B and second exit polarizer plate 934R, 934G, 934B.

Therefore, this exemplary embodiment can reduce or prevent the interference between the heat generated on the first exit polarizer plate 920R, 920G, 920B and second exit polarizer plate 934R, 934G, 934B and the heat generated on the liquid-crystal panel 400*r*, 400*g*, 400*b*, making it possible to positively reduce or prevent the deterioration due to the temperature rise of the first exit polarizer plate 920R, 920G, 920B and second exit polarizer plate 934R, 934G, 934B.

In this exemplary embodiment, connections are made, for heat conduction, of the first heat conductor plate 926 to the heat conductor block 928 through the first heat conductive rubber member 932, of between the metal frames 904 through the heat conductor member 940, and of the metal frame 902 to the pillar 922A on optical-part housing 922 through the second heat conductive rubber member 924, respectively. Accordingly, the first heat conductor plate 926 and metal frames 902, 904 have an increased heat radiation area and increased heat capacity, thus making it possible to raise the cooling efficiency as a whole.

Furthermore, in this exemplary embodiment, because the first heat conductor plates 926 for R•G•B light are joined allowing for heat conduction by the first heat conductive rubber member 932, temperature rise can be equalized between the polarizer plate 920G, 920B for G•B light comparatively great in heat generation amount and the polarizer plate 920R for R light comparatively small in heat generation amount, thus making it possible to prevent the occurrence of variation in component life.

2. Second Exemplary Embodiment

Figure 8:
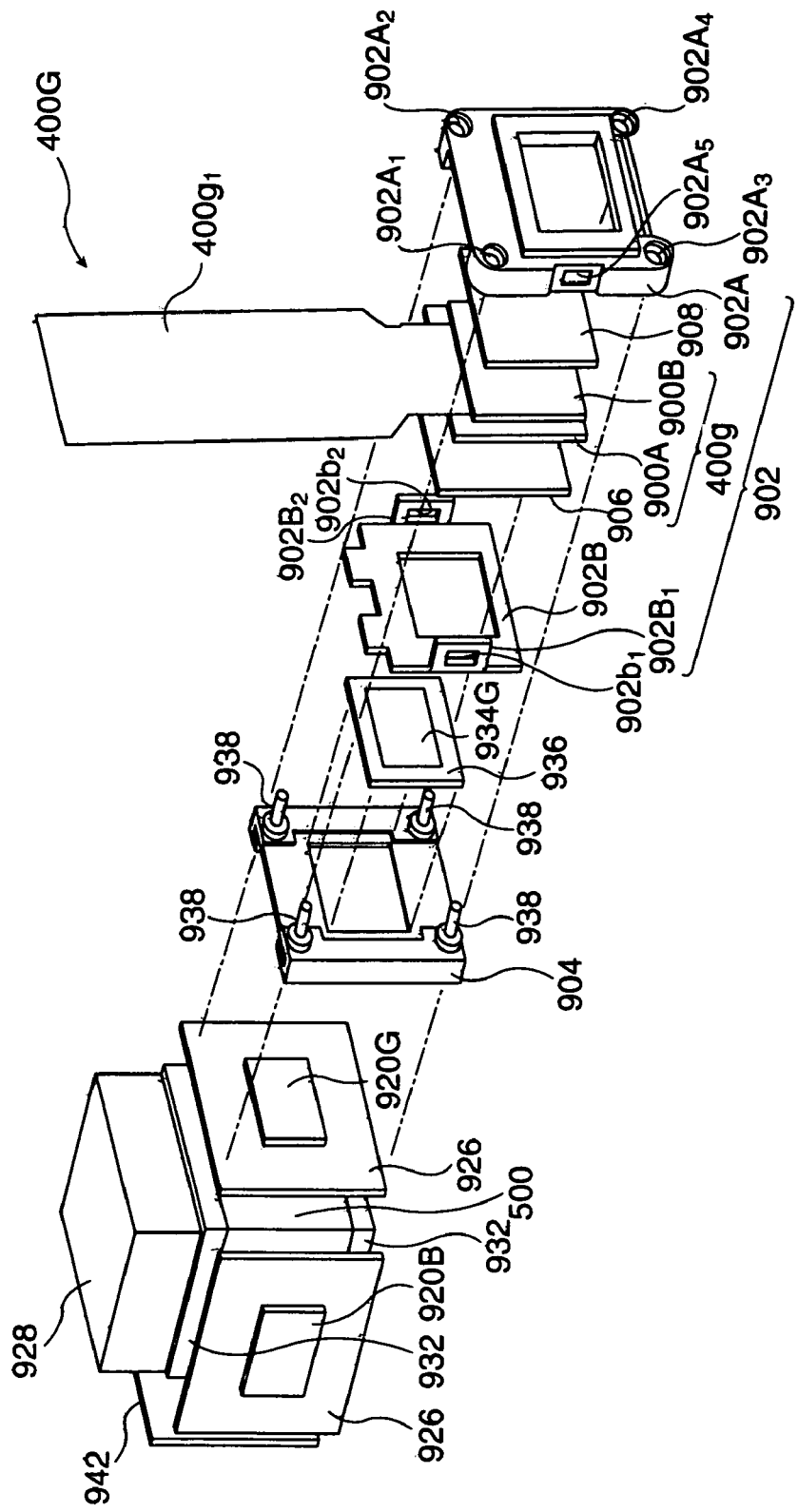
FIG. 8 is a schematic showing a mounting state of the liquid-crystal display of a second exemplary embodiment.

Next, a second exemplary embodiment of the invention is explained with using FIG. 8.

FIG. 8 is a schematic showing an optical device according to a second exemplary embodiment of the invention. In FIG. 8, the members that are the same as FIG. 3 are attached with the same references, omitting the detailed explanations.

The optical device shown in this exemplary embodiment is characterized in that the first exit polarizer plate and the second exit polarizer plate are joined with each other, allowing for heat conduction.

For this reason, on a first heat conductor plate 926 arranged at a G-light incident side of the color-combining optical system 500, a second heat conductor plate 936 to be bonded with a second exit polarizer plate 934G is adhered allowing for heat conduction through a metal frame 904 as a polarizer-plate holding frame.

Likewise, on a first heat conductor plate 926 arranged at a R•B-light incident side of the color-combining optical system 500, a second heat conductor plate 936 to be bonded with a second exit polarizer plate 934R, 934B (not shown in FIG. 8) is adhered through the metal frame 904.

Because of this structure, the heat given off from the second exit polarizer plate 934R, 934G, 934B is thermally conducted to the metal frame 904 through the second heat conductor plate 936, and then thermally conducted from this metal frame 904 to the first heat conductor plate 926. The amount of heat generation (the amount of heat absorption) is equalized between the first exit polarizer plate 920R, 920G, 920B on the first heat conductor plate 926 and the second exit polarizer plate 934R, 934G, 934B on the second heat conductor plate 936. These exit polarizer plates can be suppressed from rising in temperature as a whole.

The first heat conductor plate 926, the second heat conductor plate 936 and the metal frame 904 are joined together on the metal frame 902 through heat-insulation pins 938. Accordingly, the first exit polarizer plate 920R, 920G, 920B and the second exit polarizer plate 934R, 934G, 934B are both thermally insulated from the liquid-crystal panel 400*r*, 400*g*, 400*b*.

Accordingly, this exemplary embodiment can reduce or prevent the interference between the heat generated on the first exit polarizer plate 920R, 920G, 920B and second exit polarizer plate 934R, 934G, 934B and the heat generated on the liquid-crystal panel 400*r*, 400*g*, 400*b*, thus making it possible to suppress the deterioration in the first exit polarizer plate 920R, 920G, 920B and second exit polarizer plate 934R, 934G, 934B due to temperature rise.

Meanwhile, in the present exemplary embodiment, the first heat conductor plate 926 for R•G•B-light, the second heat conductor plate 936 for R•G•B-light and the metal frame 904 are joined, for heat conduction, onto a heat conductor block 928 by a first heat conductive rubber member 932. Accordingly, it is possible to equalize temperature rise on the first exit polarizer plate 920G, 920B for G•B-light and second exit polarizer plate 934G, 934B for G•B-light comparatively great in heat generation amount and the first exit polarizer plate 920R and second exit polarizer plate 934R for R-light comparatively small in heat generation amount, thus making it possible to reduce the likelihood or prevent these exit polarizer plates from rising in temperature as a whole.

Figure 9:
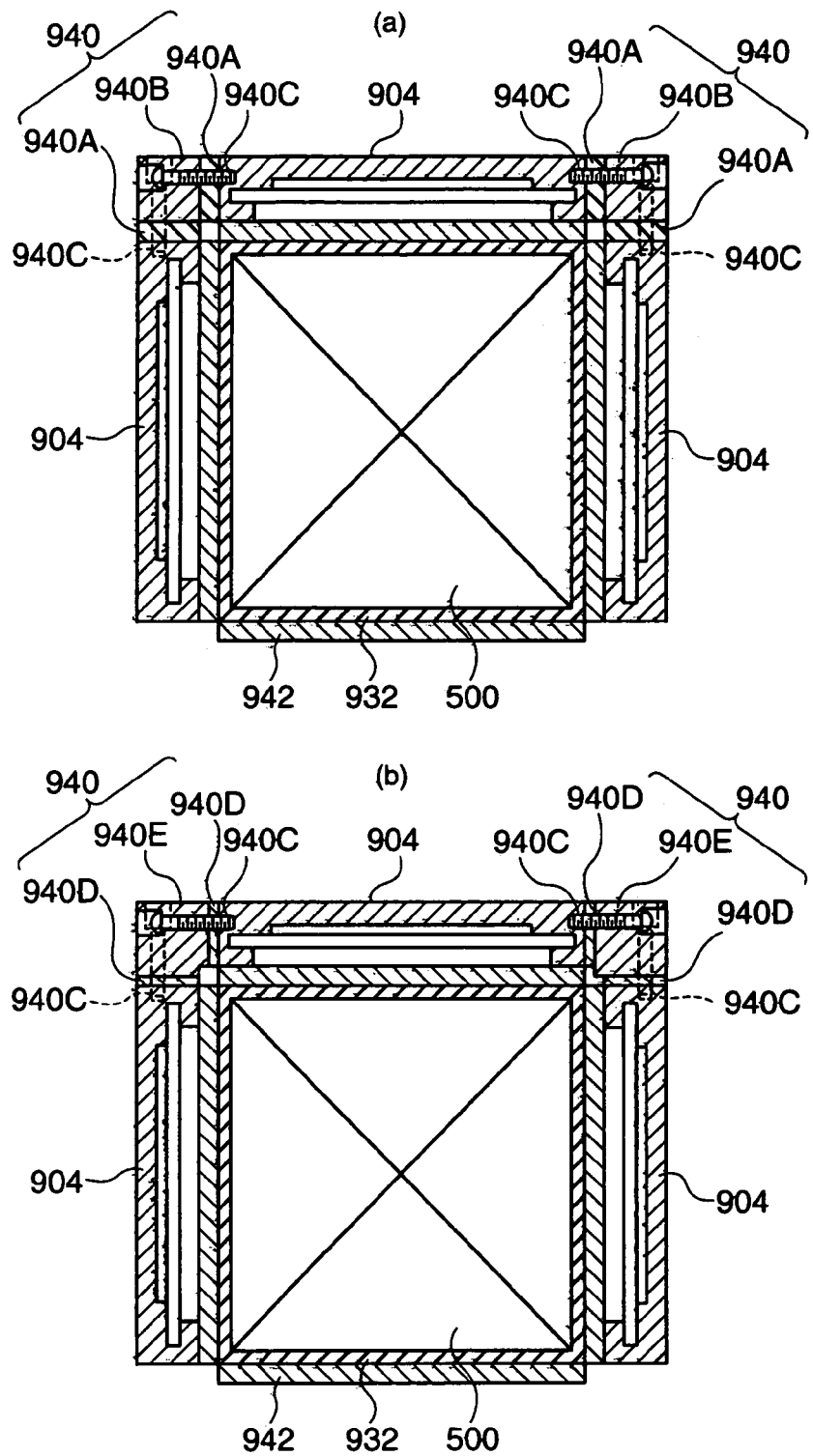
FIGS. 9(*a*) and 9(*b*) are schematics showing other joining state of the polarizer-plate holding frame.
Figure 10:
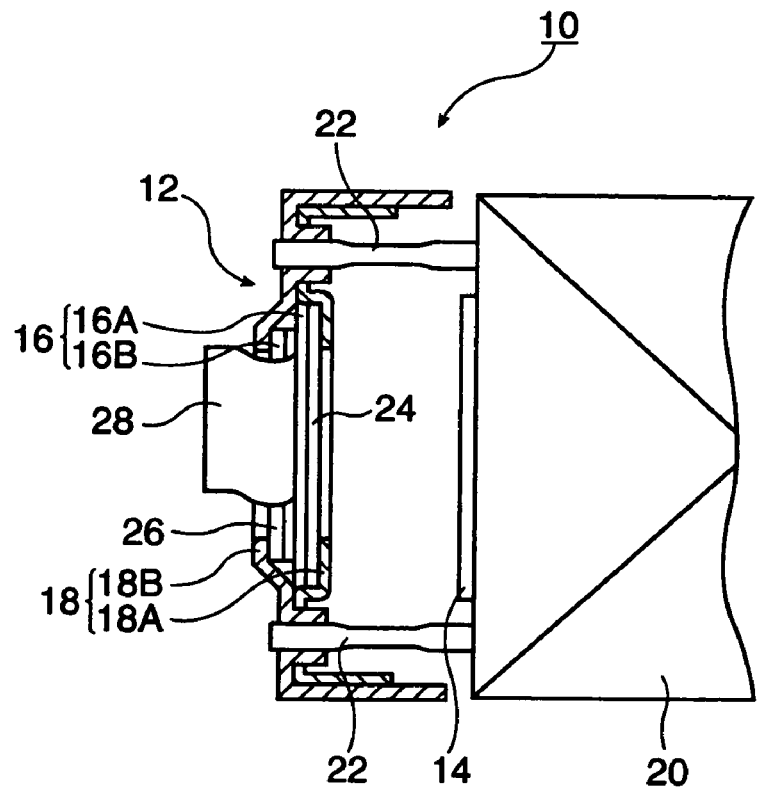
FIG. 10 is a schematic showing a related art liquid-crystal display.
Figure 11:
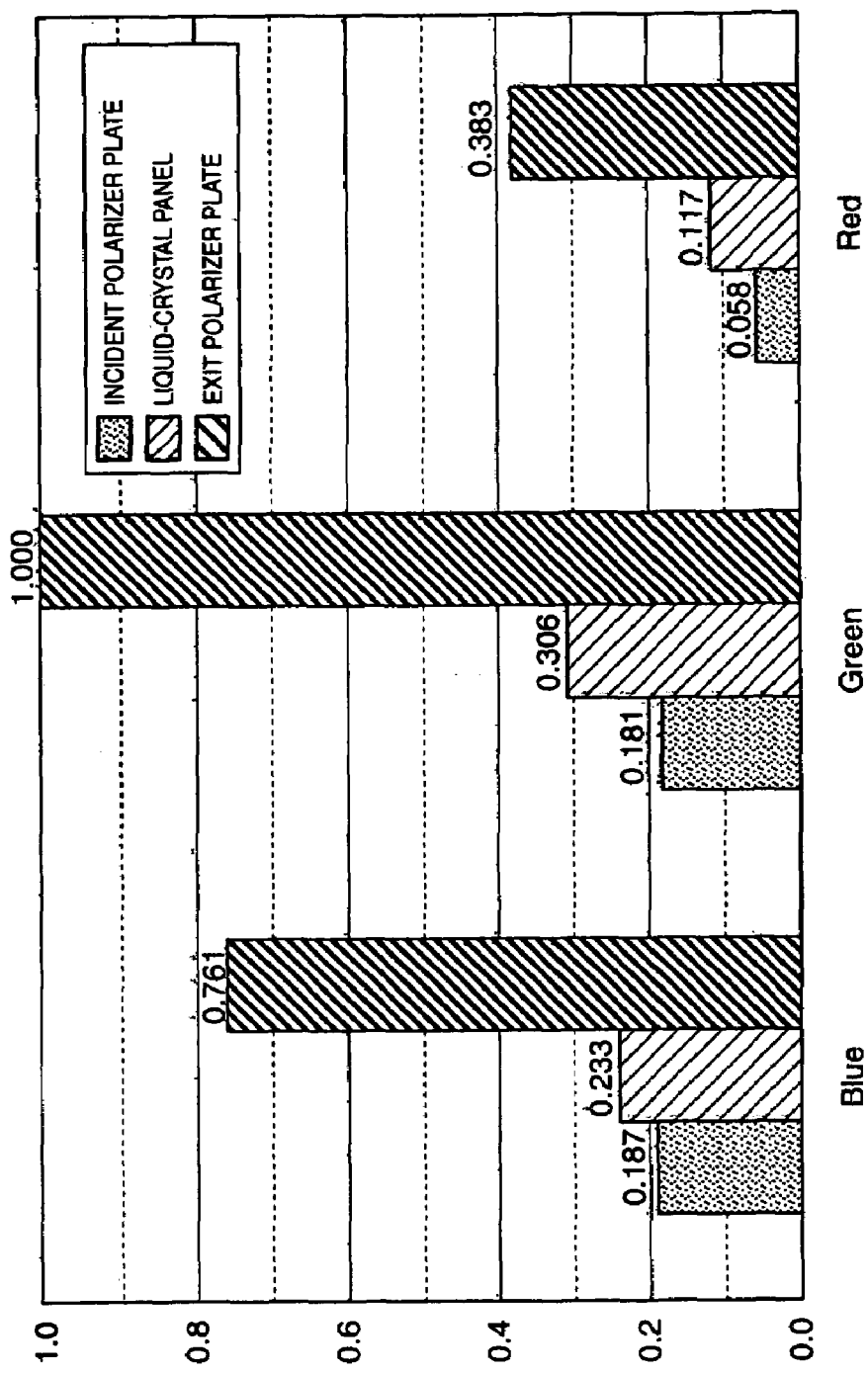
FIG. 11 is a chart showing a result of measurement for heat generation amount on the liquid-crystal panel and a polarizer plate.

Although the present exemplary embodiment explained the case that formed of heat conductive rubber is the heat conductor member 940 interposed between the mutually adjacent two metal frames 904 of among the metal frames 904 for R•G•B-light, the invention is not limited to this and may be formed of heat conductive rubber and heat conductive resin or metal. In this case, as shown in FIG. 9(*a*), a first heat conductive member 940A of heat conductive rubber is adhered to the mutually adjacent two metal frames 904 of among the three metal frames 904. Between both these heat conductive members 940A, interposed is a second heat conductive member 940B of heat conductive resin or metal. The first heat conductive members 940A and the second heat conductive member 940B are tightened by screws 940C to the metal frames 904.

Because of the structure like this, the heat conductive members 940 (first heat conductive member 940A and second heat conductive member 940B) are firmly adhered to the mutually adjacent two metal frames 904 of the three metal frames 904. Due to this, heat conduction is effected further efficiently between the mutually adjacent two metal frames 904 through the heat conductive member 940.

The heat conductive member 940 of an exemplary aspect of the invention may be formed of graphite and heat conductive resin or metal. In this case, as shown in FIG. 9(*b*), a first heat conductive member 940D of graphite in a sheet form is adhered to the mutually adjacent two metal frames 904 of among the three metal frames 904. Between both these heat conductive members 940D, is interposed a second conductive member 940E of heat conductive resin or metal. The first heat conductive member 940D and the second heat conductive member 940E are tightened on the metal frames 904 by screws 940C.

Because of the structure like this, the heat conductive member 940 (first heat conductive member 940D and second heat conductive member 940E) is firmly adhered to the mutually adjacent two metal frames 904 of among the three metal frames 904. Due to this, heat conduction is effected further effectively between the mutually two adjacent metal frames 904 through the heat conductive member 940.

3. Third Exemplary Embodiment

Although the above exemplary embodiment had the exit polarizer plates on all the optical paths for red, green and blue made by two exit polarizer plates (first and second exit polarizer plates), the invention is not limited to this. For example, the exit polarizer plate on the green optical path may be made by two exit polarizer plates (first and second exit polarizer plates) or the exit polarizer plate on the green and blue optical path may be made by two exit polarizer plates (first and second exit polarizer plates).

Because this also allows the heat, as generated in one exit polarizer plate on the green or green-and-blue optical path, to generate separately on the two exit polarizer plates, it is possible to suppress the temperature rise on the exit polarizer plates in a position where the problem of temperature rise is conventionally conspicuous, and to suppress deterioration.

The invention claimed is:

1. An optical device, comprising:
a plurality of optical modulator units, each having a liquid-crystal panel and a plurality of exit polarizer plates arranged to be heat insulated from the liquid-crystal panel; and
a color-combining optical unit to combine parts of light modulated by the plurality of optical modulator units, the color combining optical unit having a plurality of incident surfaces; the plurality of exit polarizer plates of the plurality of optical modulator units each being separated in an optical axis direction, to have two exit polarizer plates including a first exit polarizer plate arranged at an incident side of each incident surface and a second exit polarizer plate arranged at an exit side of the liquid-crystal panel,
the optical device further comprising for each incident surface of the color-combining optical unit:
a first heat conductor plate, the color-combining optical unit bonded with the first heat conductor plate on each incident surface, and the first exit polarizer plate bonded on the first heat conductor plate and attached with a plurality of heat-insulation pins projecting toward the liquid-crystal panel; and
on the plurality of heat-insulation pins, a polarizer-plate holding frame to hold a second heat conductor plate bonded with the second exit polarizer plate and a liquid-crystal panel holding frame holding the liquid-crystal panel are mutually fixed with a predetermined spacing.

2. The optical device of claim 1, each first exit polarizer plate arranged to be thermally insulated from each corresponding second exit polarizer plate.

3. The optical device of claim 1, further comprising:
a first heat conductor plate thermally connected to a heat conductive block which is adjacently connected to the color-combining optical unit; and
a plurality of liquid-crystal panel holding frames being thermally joined to an optical component housing supporting the color-combining optical unit.

4. The optical device as claimed in claim 1, the plurality of polarizer-plate holding frames are thermally connected with each other.

5. The optical device of claim 4, the plurality of polarizer-plate holding frames are thermally connected by heat conductive rubber.

6. The optical device of claim 4, the plurality of polarizer-plate holding frames are thermally connected by a plurality of heat conductive layers adhered to mutually adjacent polarizer-plate holding frames and a plurality of heat conductive members interposed between the heat conductive layers.

7. The optical device of claim 1, the second exit polarizer plate has a cross transmissivity set at a transmissivity greater than 50% of a total transmissivity.

8. The optical device of claim 1, the first heat conductor plate being formed by a member higher in heat conductivity than the second heat conductor plate.

9. A projector, comprising:
an illumination device to emit illumination light;
a color-separation optical system to separate illumination light emitted from the illumination device into a plurality of color lights; and
a plurality of optical devices to modulate color lights separated by the color-separation optical system and form an image,
the optical device being the optical device as claimed in claim 1.

10. The projector of claim 9, each first exit polarizer plate arranged to be thermally insulated from each corresponding second exit polarizer plate.

11. The projector of claim 9, further comprising:
a first heat conductor plate thermally connected to a heat conductive block which is adjacently connected to the color-combining optical unit; and
a plurality of liquid-crystal panel holding frames being thermally joined to an optical component housing supporting the color-combining optical unit.

12. The projector as claimed in claim 9, the plurality of polarizer-plate holding frames are thermally connected with each other.

13. The projector of claim 12, the plurality of polarizer-plate holding frames are thermally connected by heat conductive rubber.

14. The projector of claim 12, the plurality of polarizer-plate holding frames are thermally connected by a plurality of heat conductive layers adhered to mutually adjacent polarizer-plate holding frames and a plurality of heat conductive members interposed between the heat conductive layers.

15. The projector of claim 9, the second exit polarizer plate has a cross transmissivity set at a transmissivity greater than 50% of a total transmissivity.

16. The projector of claim 9, the first heat conductor plate being formed by a member higher in heat conductivity than the second heat conductor plate.

17. An optical device comprising:

a plurality of optical modulator units each having a liquid-crystal panel and a plurality of exit polarizer plates arranged to be heat insulated from the liquid-crystal panel, a color-combining optical unit to combine parts of light modulated by the plurality of optical modulator units, the color combining optical unit having a plurality of incident surfaces; and an optical modulator unit to be passed by a greatest intensity of light among the plurality of optical modulator units including two exit polarizer plates arranged separately in an optical axis direction, the optical device further comprising for each incident surface of the color-combining optical unit:

a first heat conductor plate, the color-combining optical unit bonded with the first heat conductor plate on each incident surface, and the first exit polarizer plate bonded on the first heat conductor plate and attached with a plurality of heat-insulation pins projecting toward the liquid-crystal panel; and on the plurality of heat-insulation pins, a polarizer-plate holding frame to hold a second heat conductor plate bonded with the second exit polarizer plate and a liquid-crystal panel holding frame holding the liquid-crystal panel are mutually fixed with a predetermined spacing.

18. A projector, comprising:

an illumination device to emit illumination light;

a color-separation optical system to separate illumination light emitted from the illumination device into a plurality of color lights; and a plurality of optical devices to modulate color lights separated by the color-separation optical system and form an image, the optical device being the optical device as claimed in claim 17.

* * * * *